(12) United States Patent
Fu et al.

(10) Patent No.: US 12,401,481 B2
(45) Date of Patent: Aug. 26, 2025

(54) METHOD AND DEVICE FOR RECEIVING AND TRANSMITTING DATA AND/OR CONTROL INFORMATION

(71) Applicant: Samsung Electronics Co., Ltd., Suwon-si (KR)

(72) Inventors: Jingxing Fu, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

(21) Appl. No.: 17/804,467

(22) Filed: May 27, 2022

(65) Prior Publication Data

US 2022/0400393 A1    Dec. 15, 2022

(30) Foreign Application Priority Data

Jun. 11, 2021    (CN) .......................... 202110653705.3
Dec. 2, 2021    (CN) .......................... 202111463048.2

(51) Int. Cl.
*H04W 24/02*    (2009.01)
(52) U.S. Cl.
CPC .................................. *H04W 24/02* (2013.01)
(58) Field of Classification Search
CPC ..................................................... H04W 24/02
See application file for complete search history.

(56) References Cited

U.S. PATENT DOCUMENTS

2012/0257532 A1    10/2012 Nakada
2013/0035090 A1    2/2013 Moshfeghi
2019/0021100 A1    1/2019 Natarajan et al.
2020/0344784 A1    10/2020 Tang
2021/0014866 A1    1/2021 Shi et al.
2021/0044412 A1    2/2021 Li et al.
2023/0268982 A1*    8/2023 Li ..................... H04B 7/15507
                                                                    370/315

(Continued)

FOREIGN PATENT DOCUMENTS

CN    101784125 A    7/2010

OTHER PUBLICATIONS

Qualcomm Inc., R4-2104704, 'Repeaters in TDD', Apr. 12-20, 2021, 3GPP TSG-RAN WG4 #98-bis-3, pp. 1-3. (Year: 2021).*

(Continued)

*Primary Examiner* — Melvin C Marcelo

(57) ABSTRACT

The disclosure relates to a 5G or 6G communication system for supporting a higher data transmission rate. The present disclosure provides a method and device for receiving and/or transmitting data and/or control information, which can improve the reception performance of receiving and transmitting data and/or control information of electronic devices such as repeaters and UEs. According to an aspect of the present disclosure, there is provided a method for receiving and/or transmitting data and/or control information, executed by a node device, comprising: acquiring state related information of the node device; determining a work state of the node device according to the state related information of the node device; and according to the determined work state of the node device, stopping working or performing reception and/or transmission of the data and/or control information accordingly.

16 Claims, 17 Drawing Sheets

(56) References Cited

U.S. PATENT DOCUMENTS

2024/0322990 A1* 9/2024 Zhang .................. H04L 5/0053
2025/0047545 A1* 2/2025 Tian ..................... H04L 5/1469

OTHER PUBLICATIONS

Definition of System Information Block, retrieved Feb. 14, 2025. (Year: 2025).*
International Search Report and Written Opinion of the International Searching Authority dated Sep. 7, 2022 in connection with International Patent Application No. PCT/KR2022/007801, 10 pages.
Supplementary European Search Report dated Oct. 18, 2024, in connection with European Application No. 22820473.1, 8 pages.
Intel Corporation, "PHY layer enhancements for NR IAB," R1-1810770, 3GPP TSG RAN WG1 #94bis, Chengdu, China, Oct. 2018, 13 pages.

* cited by examiner

METHOD AND DEVICE FOR RECEIVING AND TRANSMITTING DATA AND/OR CONTROL INFORMATION

CROSS-REFERENCE TO RELATED APPLICATIONS

This application is based on and claims priority under 35 U.S.C. § 119 to Chinese Patent Application No. 202110653705.3, filed on Jun. 11, 2021, and No. 202111463048.2 filed on Dec. 2, 2021, in the CNIPA, the disclosure of which is incorporated by reference herein in its entirety.

BACKGROUND

1. Field

The present application relates to the field of wireless communication technology, and more specifically to a method and device for receiving and transmitting data and/or control information.

2. Description of Related Art 5G mobile communication technologies define broad frequency bands such that high transmission rates and new services are possible, and can be implemented not only in "sub 6 GHz" bands such as 3.5 GHz, but also in "above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing may be connected to communication networks, and it is accordingly expected that enhanced functions and performances of 5G mobile communication systems and integrated operations of connected devices may be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems may serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure has been made to provide at least the advantages described below. Accordingly, an aspect of the present disclosure provides a method and device for improved the reception performance of receiving and transmitting data and/or control information of electronic devices.

The present disclosure provides a method and device for receiving and/or transmitting data and/or control information, which can improve the reception performance of receiving and transmitting data and/or control information of electronic devices such as repeaters and UEs.

According to an aspect of the present disclosure, there is provided a method for receiving and/or transmitting data and/or control information, executed by a node device, comprising: acquiring state related information of the node device; determining a work state of the node device according to the state related information of the node device; and according to the determined work state of the node device, stopping working or performing reception and/or transmission of the data and/or control information accordingly.

In one example, the state related information comprises at least one of the following: work state information; uplink and downlink indication information; beam indication information; and power indication information.

In one example, the work state information is obtained by at least one of the following: receiving a work state indication signal transmitted by a base station; receiving the information indication of a work state indication channel transmitted by the base station; determining by measuring the signal energy within a period of time; or determining by high-layer signaling configuration information.

In one example, the uplink and downlink indication information is received by at least one of the following: cell-specific high-layer signaling configuration information; node-device-specific high-layer signaling configuration information; media access layer information; and group-common downlink control information (DCI). In a further embodiment, the cell-specific high-layer signaling configuration information is system information, such as an existing SIB or a SIB specific to the node device. In a further embodiment, before receiving the group-common downlink control information (DCI), the node device obtains at least one of the following items by receiving the high-layer signaling: the period of the node device blindly detecting the group-common DCI; the format of the DCI; the payload size of the DCI; the control resource set (CORESET); the Search space; and the contents indicated by the fields in the DCI, wherein the high-layer signaling can be the cell-specific high-layer signaling configuration information.

In one example, the uplink and downlink indication information indicates whether the node device is in an uplink period, a downlink period or a flexible period, and the method further comprises: receiving uplink data and/or uplink control information from a UE and transmitting the uplink data and/or uplink control information received from the UE to a base station when the uplink and downlink indication information indicates that the node device is in an uplink period; or receiving downlink data and/or downlink control information from the base station and then transmitting the downlink data and/or downlink control information received from the base station to the UE when the uplink and downlink indication information indicates that the node device is in a downlink period; or stopping transmission or transmitting in a default mode when the uplink and downlink indication information indicates that the node device is in a flexible period; or transmitting an uplink signal or an uplink channel to the base station when the uplink and downlink indication information indicates that the node device is in a flexible period. In an embodiment, when the node device is in a flexible period, the node device can transmit uplink signals (SRS and/or PRACH) or uplink channels (PUCCH and/or PUSCH) to the base station.

The advantage of doing this is that transmitting uplink signals and uplink channels to the base station by the node device is separated from forwarding data and control information by the node device in time, which reduces the complexity of node device implementation.

In a further embodiment, when the node device changes from the uplink period to the downlink period or from the downlink period to the uplink period, there is a guard interval T during which the node device does not receive and transmit channels and signals. In a specific embodiment, the guard interval T is preset by protocol or determined by high-layer signaling.

In one example, at least two of the work state information, the uplink and downlink indication information and the beam indication information are received by information carried in a channel.

In one example, the node device comprises a repeater.

According to another aspect of the present disclosure, there is provided a node device, comprising: a memory that stores data and instructions; and a processor configured to perform the method as described above.

According to another aspect of the present disclosure, there is provided a method performed by a second UE, comprising: receiving uplink channel occupancy indication information from a first UE; and transmitting an uplink channel according to the received uplink channel occupancy indication information.

In one example, the uplink channel is at least one of PUSCH, PUCCH or SRS.

In one example, the first UE transmits the uplink channel occupancy indication information when occupying the uplink channel; or the first UE transmits the uplink channel occupancy indication information when not occupying the uplink channel.

According to another aspect of the present disclosure, there is provided a second UE apparatus, comprising: a memory that stores data and instructions; and a processor configured to perform the method as described above.

The present disclosure provides a method and device for receiving and/or transmitting data and/or control information, which can improve the reception performance of receiving and transmitting data and/or control information of electronic devices such as repeaters and UEs. Advantages, and salient features of the present disclosure will become apparent to those skilled in the art from the following detailed description, which, taken in conjunction with the annexed drawings, discloses exemplary embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other objects and features of the exemplary embodiments of the present disclosure will become clearer from the following description taken in conjunction with the accompanying drawings which exemplarily show the embodiments, in which.

DETAILED DESCRIPTION

Figure 1:
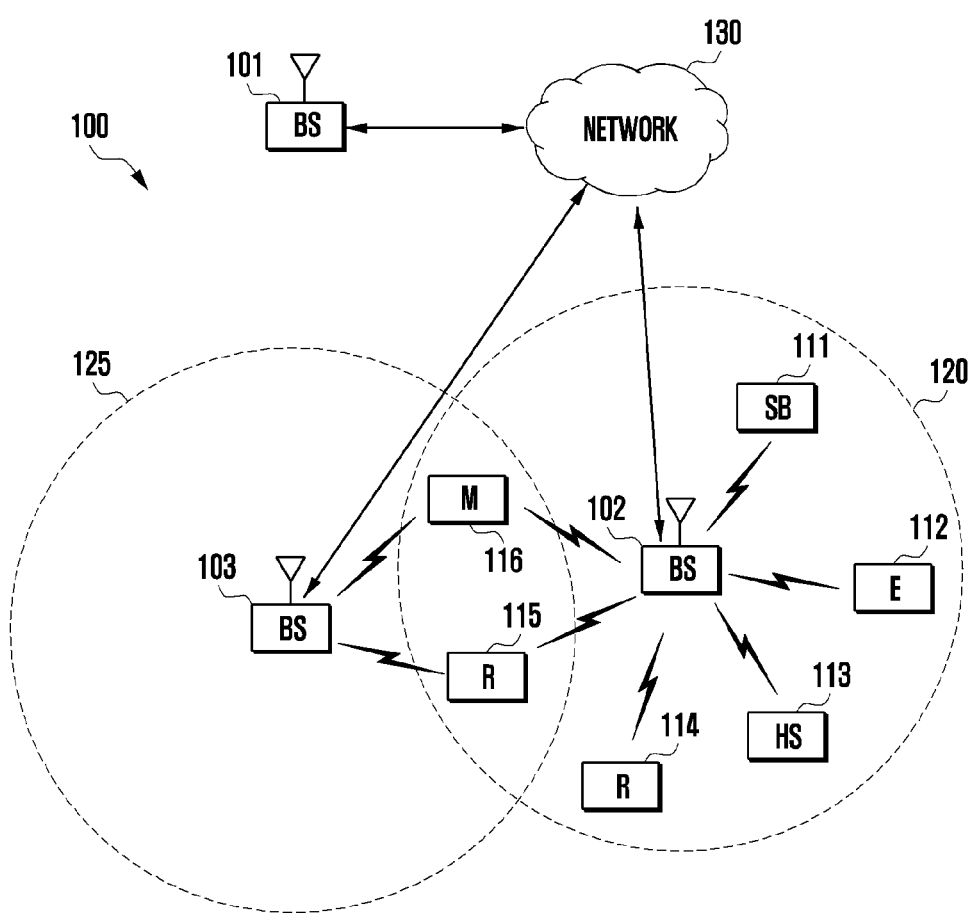
FIG. 1 illustrates an example wireless network 100 according to various embodiments of the present disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed words. For example, the expression "A or B" may include A, may include B, or may include both A and B.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

In order to make the purpose, technical solutions, and advantages of the application clearer, the application will be further described in detail below with reference to the accompanying drawings and embodiments.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. The gNB 101 communicates with the gNB 102 and the gNB 103. The gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals. And, depending on the type of the network, other well-known terms such as "mobile station," "user station," "remote terminal," "wireless terminal" or "user apparatus" can be used instead of "user equipment" or "UE." For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of user equipments (UEs) within a coverage area 120 of the gNB 102. The first plurality of UEs include a UE 111, which may be located in a small business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The GNB 103 provides wireless broadband access to network 130 for a second plurality of UEs within a coverage area 125 of the gNB 103. The second plurality of UEs include a UE 115 and a UE 116. In some embodiments, one or more of gNBs 101-103 can communicate with each other and with UEs 111-116 using 5G, long term evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of the gNB 101, the gNB 102, and the gNB 103 include a 2D antenna array as described in embodiments of the present disclosure. In some embodiments, one or more of the gNB 101, the gNB 102, and the gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, the gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, the gNB 101, 102 and/or 103 can provide access to other or additional external networks, such as external telephone networks or other types of data networks.

Figure 2A:
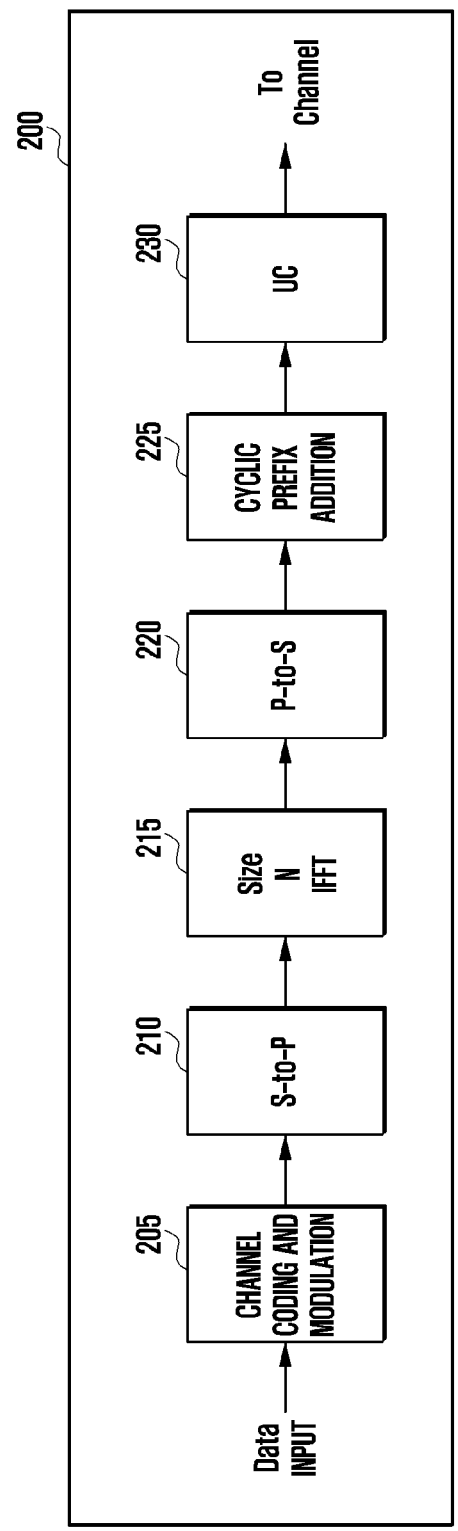
FIG. 2A illustrates example wireless transmission and reception paths according to the present disclosure.
Figure 2B:
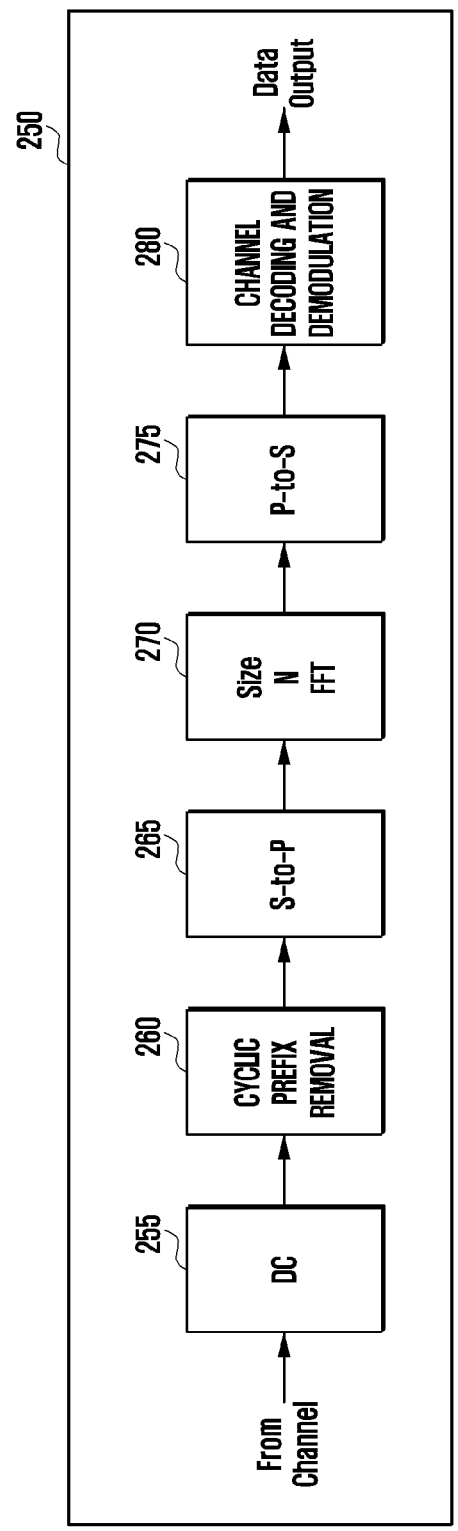
FIG. 2B illustrates example wireless transmission and reception paths according to the present disclosure.

FIGS. 2A and 2B illustrate example wireless transmission and reception paths according to the present disclosure. In the following description, the transmission path 200 can be described as being implemented in a gNB, such as the gNB 102, and the reception path 250 can be described as being implemented in a UE, such as the UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in the gNB 102 and the UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 116 after passing through the wireless channel, and operations in reverse to those at the gNB 102 are performed at the UE 116. The down-converter 255 down-converts the received signal to a baseband frequency, and the cyclic prefix removal block 260 removes the cyclic prefix to generate a serial time-domain baseband signal. The Serialto-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
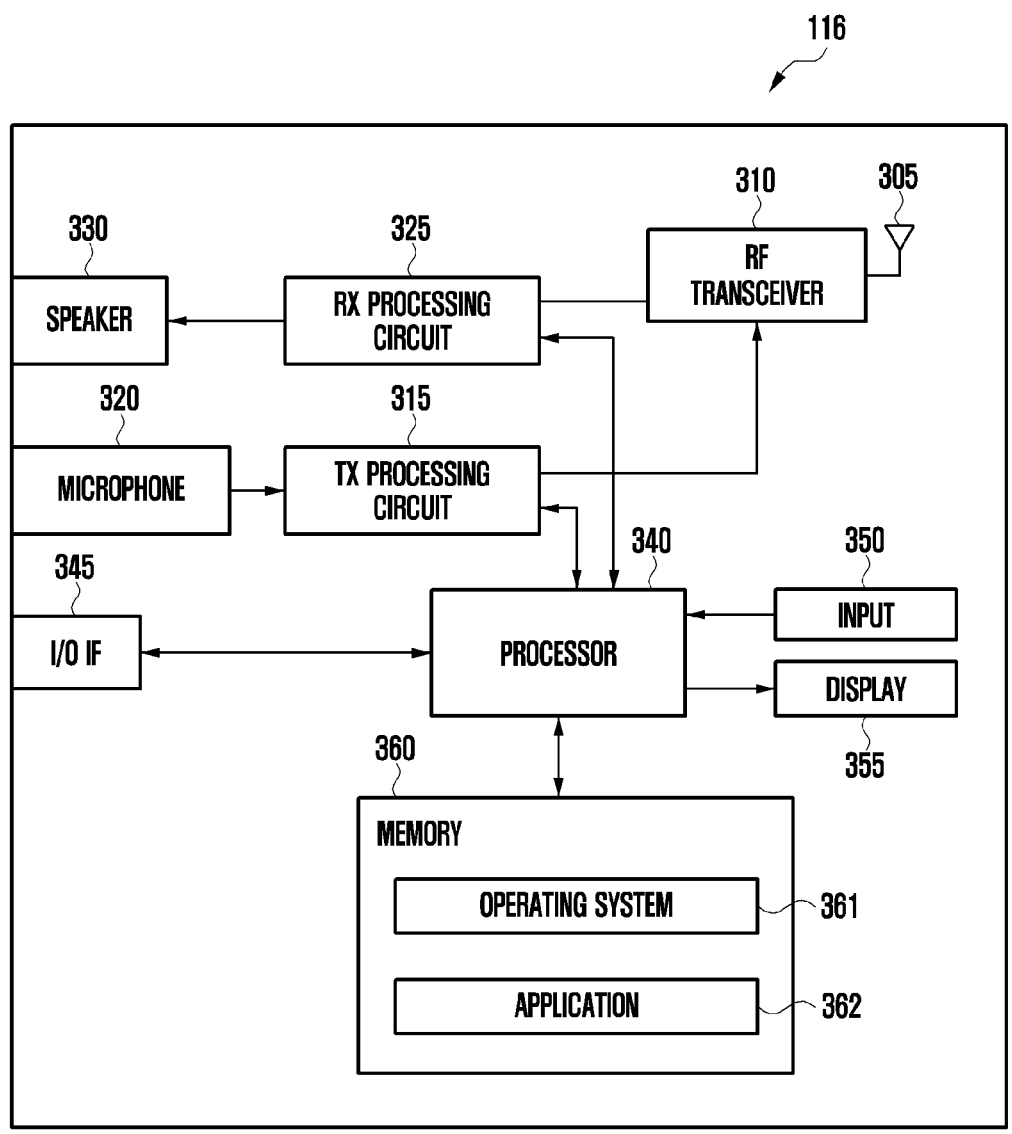
FIG. 3A illustrates an example UE 116 according to the present disclosure.

FIG. 3A illustrates an example UE 116 according to the present disclosure. The embodiment of the UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

The UE 116 includes an antenna 305, a radio frequency (RF) transceiver 310, a transmission (TX) processing circuit 315, a microphone 320, and a reception (RX) processing circuit 325. The UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of the UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides the UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of the UE 116 can input data into the UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of the UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
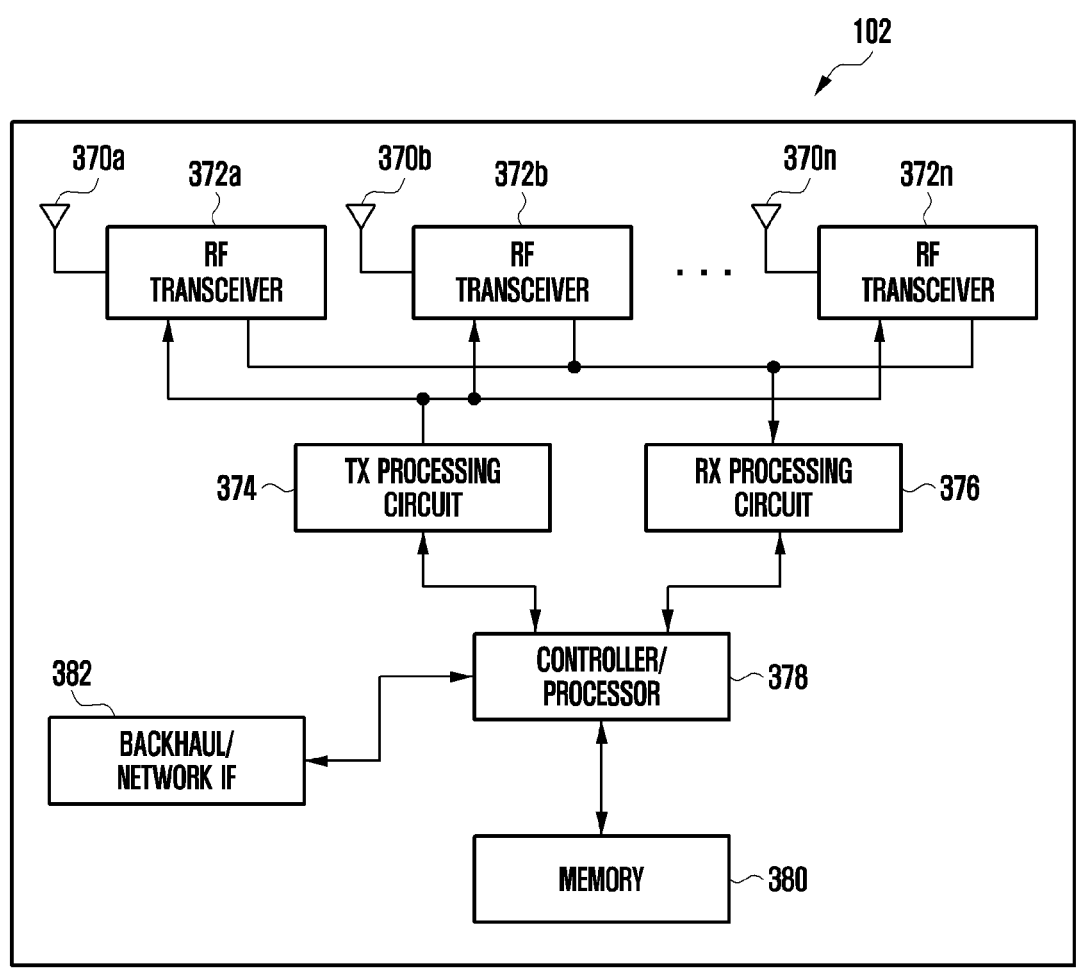
FIG. 3B illustrates an example gNB 102 according to the present disclosure.

FIG. 3B illustrates an example gNB 102 according to the present disclosure. The embodiment of the gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that the gNB 101 and the gNB 103 can include the same or similar structures as the gNB 102.

As shown in FIG. 3B, the gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of the gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-layer wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of the gNB 102 (implemented using RF transceivers 372a-372n, TX processing circuit 374 and/or or RX processing circuit 376) support aggregated communication with FDD cells and TDD cells.

Although FIG. 3B illustrates an example of the gNB 102, various changes may be made to FIG. 3B. For example, the gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

In order to make the purpose, technical solutions, and advantages of the application clearer, the application will be further described in detail below with reference to the accompanying drawings and embodiments.

Figure 4:
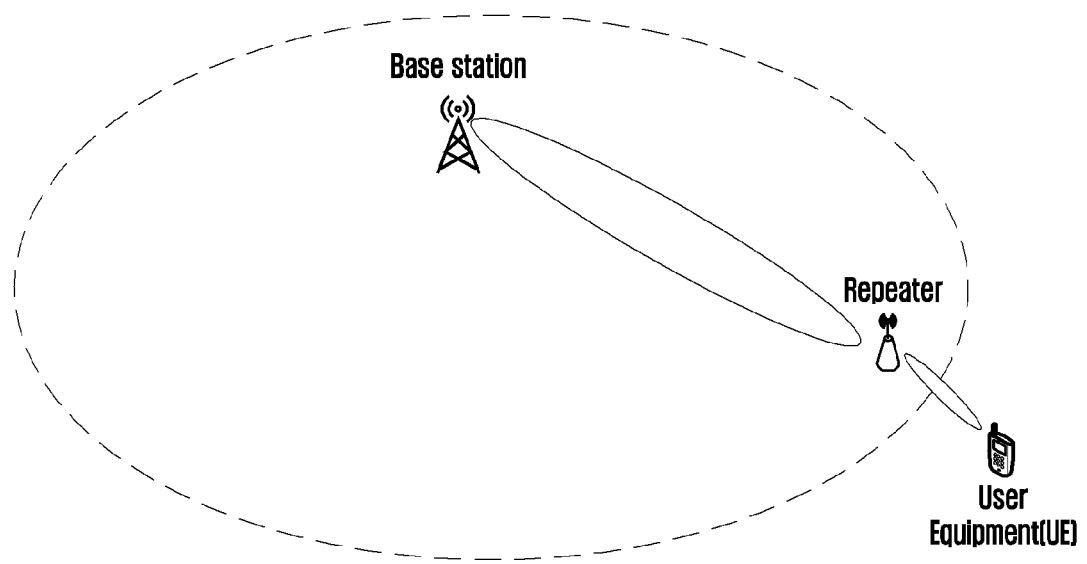
FIG. 4 illustrates an example scene in which a repeater is included.

In order to enhance the network coverage, the data and control signaling from a base station to a UE and from the UE to the base station can be forwarded by a node device, which can include a repeater (which can be called repeater or other alternative names for realizing this function), as shown in FIG. 4.

Figure 5:
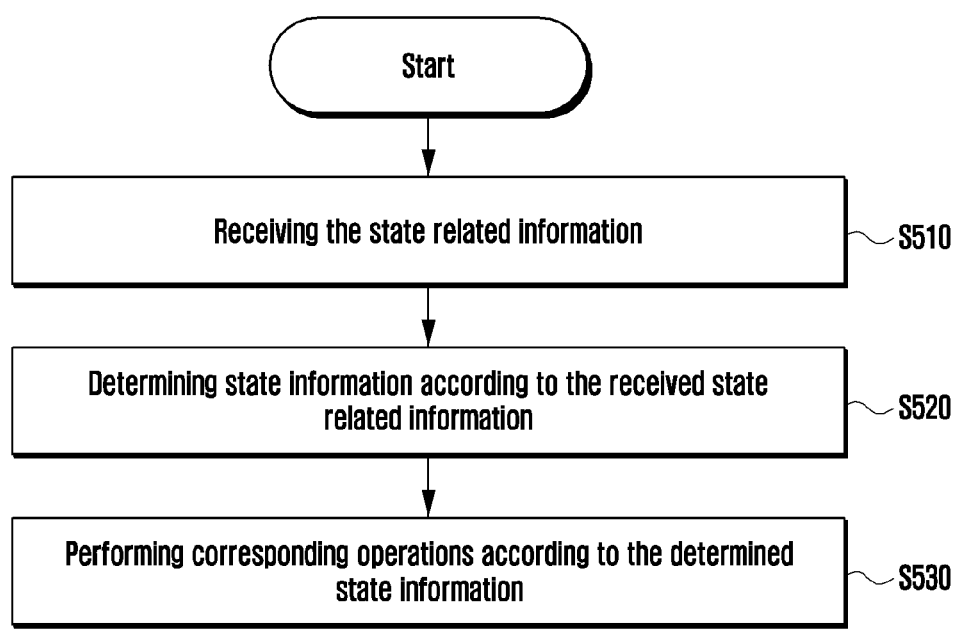
FIG. 5 illustrates an exemplary flowchart of a method 500 for receiving and transmitting data and control information according to an embodiment of the present disclosure.

FIG. 5 illustrates an exemplary flowchart of a method 500 for receiving and transmitting data and/or control information according to an embodiment of the present disclosure. The method 500 may be implemented on the repeater side.

As shown in FIG. 5, at step S510 of the method 500, the state related information of the node device is acquired. The state related information may include work state information, uplink and downlink indication information, beam indication information, and power indication information. For a detailed description of the above information, please refer to the following.

In step S520, the work state of the node device is determined according to the state related information of the node device;

In step S530, according to the determined work state of the node device, corresponding operations are performed, for example, correspondingly, the work is stopped or reception and transmission of the data and/or control information are carried out. The disclosed method can be applied to a system in which the repeater directly forwards data and/or control information on the same time-frequency resource without demodulation and decoding when receiving the data and/or control information, or a system in which the repeater demodulates and decodes the received data and/or control information and then forwards them on other resources after receiving the data and/or control information.

Figure 6:
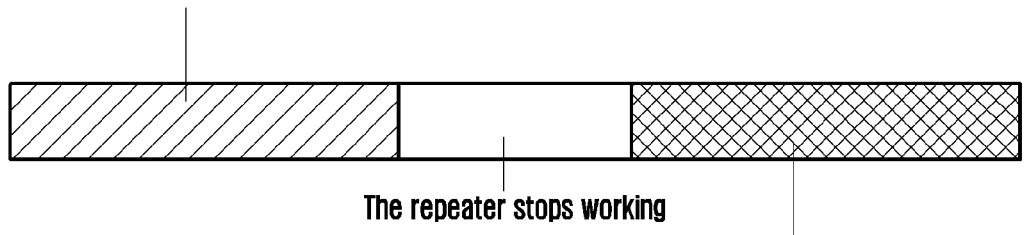
FIG. 6 illustrates an example of the work state of a repeater according to an embodiment of the present disclosure.

In a case, the repeater works by time division multiplexing, that is, the repeater receives downlink data and/or downlink control information from the base station, and then forwards the received downlink data and/or downlink control information to the UE within a time period, which can be called a downlink time period. The repeater receives uplink data and/or uplink control information from the UE, and then forwards the received uplink data and/or uplink control information to the base station within another time period, which can be called an uplink time period; and within yet another time period, the repeater stops working, as shown in FIG. 6.

For downlink data and/or downlink control information, the repeater receives the downlink data and/or downlink control information from the base station, and then forwards the received downlink data and/or downlink control information to the UE; and for uplink data and/or uplink control information, the repeater receives the uplink data and/or uplink control information from the UE, and then forwards the received uplink data and/or uplink control information to the base station.

The beam that the repeater receives the downlink data and/or downlink control information from the base station and the beam that the repeater receives the uplink data and/or uplink control information from the UE can be different, which can better improve the reception performance of the repeater. The beam that the repeater transmits the uplink data and/or uplink control information to the base station and the beam that the repeater transmits the downlink data and/or downlink control information to the UE can be different, which can better improve the transmission performance of the repeater.

The power that the repeater transmits the uplink data and/or uplink control information to the base station and the power that the repeater transmits the downlink data and/or downlink control information to the UE can be different, so that the transmission performance of data and/or control information can be met and the transmitting power can be saved as much as possible. When there is no data and/or control information to be received or transmitted for the repeater, the repeater stops working, which can prevent the repeater from transmitting and amplifying useless noise and causing interference. When the repeater knows the location of the UE, the repeater can improve the reception performance of the UE by using an appropriate beam to transmit the data and/or control information to the UE.

Therefore, before receiving and transmitting the data and/or control information, the repeater may try to determine whether the data and/or control information to be received and transmitted is downlink data and/or control information or uplink data and/or control information, and adopt appropriate methods for receiving and transmitting the data and/or control information according to whether the data and/or control information to be received and transmitted is downlink data and/or downlink control information or uplink data and/or control information, so as to improve the reception performance of the data and/or control information.

First, determination of whether the data and/or control information to be received and transmitted is downlink data and/or downlink control information or uplink data and/or uplink control information, that is, determination of whether the repeater works in an uplink period, a downlink period, or a flexible period, is explained. The data and/or control information received and transmitted by the repeater being downlink data and/or downlink control information is called that the repeater works in a downlink period, and the data and/or control information received and transmitted by the repeater being uplink data and/or uplink control information is called that the repeater works in an uplink period.

Whether the repeater works in the uplink period, the downlink period or the flexible period can be determined by the uplink and downlink indication information. After determining the work period in which the repeater is, the repeater performs corresponding actions according to the determined work period. In a more specific embodiment, when the uplink and downlink indication information indicates that the repeater is in the uplink period, the repeater receives uplink data and/or uplink control information from the UE, and then transmits the uplink data and/or uplink control information received from the UE to the base station; or when the uplink and downlink indication information indicates that the repeater is in the downlink period, the repeater receives downlink data and/or downlink control information from the base station, and then transmits the downlink data and/or downlink control information received from the base station to the UE; and when the uplink and downlink indication information indicates that the repeater is in the flexible period, the repeater stops transmission or performs transmission by default.

The uplink and downlink indication information can be acquired in the several ways as follows.

Figure 7:
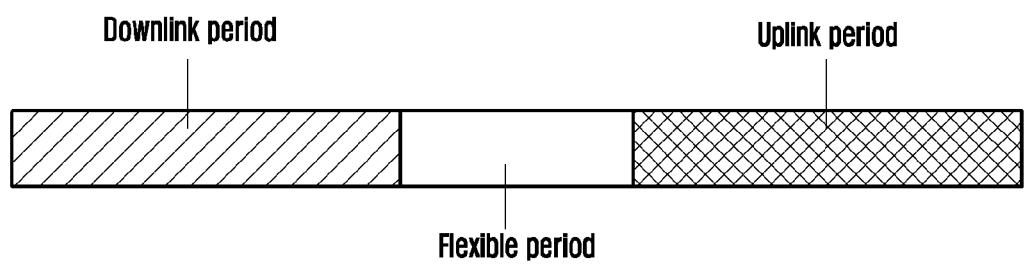
FIG. 7 illustrates an example of a work period in which a repeater is according to an embodiment of the present disclosure.

Method I:

In an embodiment, the uplink and downlink indication information can be received through cell-specific high-layer signaling configuration information (which can be system information, i.e., SIB, specifically, it can be an existing SIB, for example, SIB1, or it can be a SIB specific to the repeater). In this example, the repeater determines whether the repeater is in the uplink period or the downlink period by receiving the cell-specific high-layer signaling configuration information, and the repeater can determine whether the repeater is in the uplink period or the downlink period by receiving cell common information (for example, tdd-UL-DL-ConfigurationCommon). The repeater obtains whether a time unit is an uplink period or a downlink period or the time unit is in a flexible period (neither uplink period nor downlink period) within the time unit by receiving the information about uplink period or the downlink period. After determining the characteristics of the time period, the repeater can improve the receiving and transmission performance of the repeater. FIG. 7 illustrates examples of different work periods in which a repeater can be according to an embodiment of the present disclosure.

Method II:

In another embodiment, the uplink and downlink indication information can be received through repeater-specific high-layer signaling configuration information. In this example, the repeater determines whether the repeater is in the uplink period or the downlink period by receiving the repeater-specific high-layer signaling configuration information (for example, tdd-UL-DL-ConfigurationDedicated). The repeater determines whether the repeater is in an uplink period or a downlink period within a time unit or in a flexible period (that is, neither the uplink period nor the downlink period) within the time unit by receiving the repeater-specific high-layer signaling configuration information. After the repeater obtains the characteristics of the time period, the receiving and transmission performance of the repeater can be improved.

Method III:

In yet another embodiment, the uplink and downlink indication information can be received through group-common downlink control information (DCI). In this example, the repeater determines whether the repeater is in an uplink period or a downlink period or in a flexible period within a time unit by receiving the group-common DCI, for example, the repeater receives the index indicated by the information of DCI format 2_0, and then looks up the table to obtain whether the repeater is in an uplink period, a downlink period or a flexible period within a time unit (the time unit can be an orthogonal frequency division multiplexing (OFDM) symbol). With this method, the repeater can obtain the characteristics of the time period more accurately, thus further improving the receiving and transmission performance of the repeater.

Before the repeater receives the group-common DCI, the repeater obtains the period of the repeater blindly detecting the group-common DCI, the format of the DCI, the payload size of the DCI, the control resource set (CORESET), the Search space and the contents indicated by the fields in the DCI by receiving high-layer signaling. Only after obtaining these pieces of information, the repeater can blindly detect the group-common DCI according to these pieces of information and correctly interpret the contents in the DCI. The high-layer signaling can be cell-specific high-layer signaling configuration information (this information can be system information, i.e. SIB, which can be an existing SIB, for example, SIB1, or an SIB specific to repeater), and the method that the repeater obtains the uplink and downlink indication information by reading the SIB can make the repeater be able to know whether the serving cell has repeater indication information before accessing the system, thus avoiding finding that the serving cell does not have the repeater indication information after accessing the system.

The group-common downlink control information received by the repeater may also be DCI format x, which includes M (M is a positive integer) information blocks, each information block includes Nm bits of information, and what each information block indicates is for a group of repeaters (this group of repeaters includes at least one repeater), for example, the first N1-bit information block is for the first repeater group, and the second N2-bit information block is for the second repeater group. Each information block can indicate the information of whether the repeater is in the uplink period or the downlink period within a time unit. For example, one information block includes 2 bits, that is, includes 4 indexes, and each index represents a combination of uplink period and downlink period, as shown in Table 1, where "D" represents the downlink period, "U" represents the uplink period and "F" represents that it is not determined whether the repeater is the downlink period or the uplink period.

TABLE 1

Correspondence between the uplink and downlink indication information and uplink and downlink periods

| Uplink and downlink indication information | Time slot number | | | | | |
| --- | --- | --- | --- | --- | --- | --- |
| | Time slot 1 | Time slot 2 | Time slot 3 | Time slot 4 | Time slot 5 | Time slot 6 |
| 00 | D | D | D | D | D | D |
| 01 | D | D | D | F | F | U |
| 10 | D | D | F | F | U | U |
| 11 | U | U | U | U | U | U |

For the uplink period, the repeater receives data and/or control information from the UE and transmits the data and/or control information received from the UE to the base station. The uplink and downlink indication information obtained by the repeater includes the receiving beam B1 for the repeater to receive the data and/or control information from the UE, the transmitting beam B2 for the repeater to transmit the data and/or control information received from the UE to the base station and the transmitting power P1 for the repeater to transmit the data and/or control information received from the UE to the base station.

For the downlink period, the repeater receives data and/or control information from the base station and transmits the data and/or control information received from the base station to the UE. The information obtained by the repeater includes the receiving beam C1 for the repeater to receive the data and/or control information from the base station, the transmitting beam C2 for the repeater to transmit the data and/or control information received from the base station to the UE and the transmitting power P2 for the repeater to transmit the data and/or control information received from the base station to the UE.

It can be determined whether a time unit is an uplink period, a downlink period or a flexible period by any one of Method I, Method II, and Method III. It is also possible to determine whether a time unit is an uplink period, a downlink period or a flexible period by a method of combining at least two methods of Method I, Method II, and Method III. For example, for a time unit, the repeater obtains that the time unit is the uplink period by receiving the information about uplink period or downlink period, or the repeater obtains that the time unit is the uplink period by receiving the index indicated by the information of DCI format 2_0, and the repeater receives and transmits data and/or control information in accordance with the uplink period. With this method, the repeater can accurately obtain the information about uplink period and downlink period, thereby improving the reception performance of data and/or control information.

The following describes a method of transmitting and receiving data and/or control information after the repeater obtains the information about being in uplink period or downlink period.

The repeater receives and transmits data and/or control information according to the nature of the period in the following several situations.

Example I: It is determined that the repeater is in the uplink period.

At this time, the repeater first receives uplink data and/or uplink control information from the UE, and then transmits the uplink data and/or uplink control information received from the UE to the base station. When the repeater receives the uplink data and/or uplink control information from the UE, the repeater receives the uplink data and/or uplink control information from the UE using the beam B1 received from the UE. Then, when the repeater transmits the uplink data and/or uplink control information received from the UE to the base station, the repeater transmits the uplink data and/or uplink control information to the base station in accordance with the beam B2 transmitted to the base station. And the repeater transmits the uplink data and/or uplink control information to the base station in accordance with the power transmitted to the base station. The mode of receiving and transmitting data and/or control information by the repeater above is called Mode I of receiving and transmitting data and/or control information by the repeater.

Example II: It is determined that the repeater is in the downlink period.

At this time, the repeater first receives downlink data and/or downlink control information from the base station, and then transmits the downlink data and/or downlink control information received from the base station to the UE. When the repeater receives the downlink data and/or downlink control information from the base station, the repeater receives the downlink data and/or downlink control information from the base station using the beam C1 received from the base station. Then, when the repeater transmits the downlink data and/or downlink control information received from the base station to the UE, the repeater transmits the downlink data and/or downlink control information to the UE in accordance with the beam C2 transmitted to the UE. And the repeater transmits the downlink data and/or downlink control information to the UE in accordance with the power transmitted to the UE. The mode of receiving and transmitting data and/or control information by the repeater above is called Mode II of receiving and transmitting data and/or control information by the repeater.

Example: It cannot be determined whether the repeater is in the downlink period or the uplink period.

When it cannot be determined whether the repeater is in the downlink period or the uplink period, that is, when the repeater is in the flexible period, the repeater can execute the steps of at least one of the following two methods.

Method I:

When it cannot be determined whether the repeater is in the downlink period or the uplink period, the repeater stops working. Using this method can prevent the repeater from forwarding noise and interference.

Method II:

When it cannot be determined whether the repeater is in the downlink period or the uplink period, the repeater receives in accordance with a specific beam d1 (for example, an omnidirectional beam) and then transmits in accordance with a specific beam d2 (for example, an omnidirectional beam), and transmits in accordance with a specific power (this specific power can be the output power of the repeater, that is, the transmit power of the repeater, or the specific power can be the power amplification factor of the repeater, that is, the ratio of the output power to the input power of the repeater). Different power control parameters are adopted for the known direction and the unknown direction (the parameters can be configured by high-layer signaling or indicated by DCI, and this power control parameter can include the output power of the repeater, that is, the transmit power of the repeater, or the power control parameter can include the power amplification factor of the repeater, that is, the ratio of the output power to the input power of the repeater).

For example, the repeater knows that the repeater is working in the uplink period, and the repeater's transmitting power parameter set is P1; the repeater knows that the repeater is working in the downlink period, and the repeater's transmitting power parameter set is P2; the repeater does not know whether the repeater is working in the uplink period or the downlink period, and the repeater's transmitting power parameter set is P3. The mode of receiving and transmitting data and/or control information by the repeater is called Mode III of receiving and transmitting data and/or control information by the repeater. Alternatively, through the high-layer signaling configuration or protocol preset, data and/or control information is received and transmitted by using Mode I of receiving and transmitting data and/or control information by the repeater or Mode II of receiving and transmitting data and/or control information by the repeater. With this method, the performance of the repeater in receiving and transmitting data and/or control information is as good as possible.

When an uplink period is changed to a downlink period or a downlink period is changed to an uplink period, there may be a guard interval T. Within the interval T, the repeater neither receive nor transmit channels and signals, and the repeater can determine T through protocol preset or high-layer signaling configuration. The T when an uplink period is changed to a downlink period and the T when a downlink period is changed to an uplink period may be different or the same, for example, the guard interval T when an uplink period is changed to a downlink period is T1, and the guard interval T when a downlink period is changed to an uplink period is T2.

When the repeater's work state is in work, and when the repeater is in a downlink period, at this time, the base station transmits data and/or control information to the UE, and the repeater forwards the data and/or control information; in an uplink period, at this time, the UE transmits data and/or control information to the base station, and the repeater forwards the data and/or control information. When the repeater's work state is stopping working, the repeater does not need to forward data and/or control information, and if the repeater is still working at this time, the repeater may only forward noise and interference, which may reduce the performance of a cellular system, and the repeater working continuously may waste energy. Therefore, it is necessary to determine the work state of the repeater. The following describes how the repeater determines the work state of the repeater, that is, whether the repeater stops working or the repeater works. Specifically, there are several ways to determine it.

In the present disclosure, the repeater receives repeater work state information. According to the repeater work state information, it can be determined whether the repeater has data and/or control information that the repeater needs to receive and transmit within a time period. When it is determined the repeater need to receive and transmit the data and/or control information, the repeater is in the state of working within this time period. When it is determined the repeater does not need to receive and transmit the data and/or control information, the repeater is in the state of stopping working within this time period.

In the present disclosure, the repeater work state information includes at least one of the following: a repeater work state indication signal, and an information indication of a repeater work state indication channel. The repeater work state information is realized by at least one of downlink control information (DCI) or reference signals, or determined by measuring the signal energy in a time period, or determined by receiving the configuration of high-layer signaling, which can be cell-specific high-layer signaling configuration information (this information can be system information, namely SIB, which can be an existing SIB, for example, SIB 1, or SIB specific to the repeater).

The method that the repeater obtains the above indication information by reading SIB can make the repeater be able to know whether the serving cell has the repeater indication information before accessing the system, thus avoiding finding that the serving cell does not have the indication information related to the repeater after accessing the system, because there may be multiple serving cells included within the bandwidth where the repeater forwards information, some of which have the repeater indication information, and some of which do not. An embodiment of a repeater work state indication signal will be described in detail below. The repeater work state indication signal can be set before the repeater work time period to indicate the work state of the repeater in the following time period.

In the first method based on repeater work state information, the repeater work state indication signal may be a wireless signal independently transmitted by the base station.

The first method based on repeater work state information includes the following steps.

The repeater receives the repeater work state indication signal and determines the intensity of the repeater work state indication signal, compares the determined intensity of the repeater work state indication signal with the intensity threshold of the repeater work state indication signal of the repeater acquired in advance, and determines whether the repeater has data and/or control information that the repeater needs to receive and transmit according to the comparison result of intensity.

Figure 8:
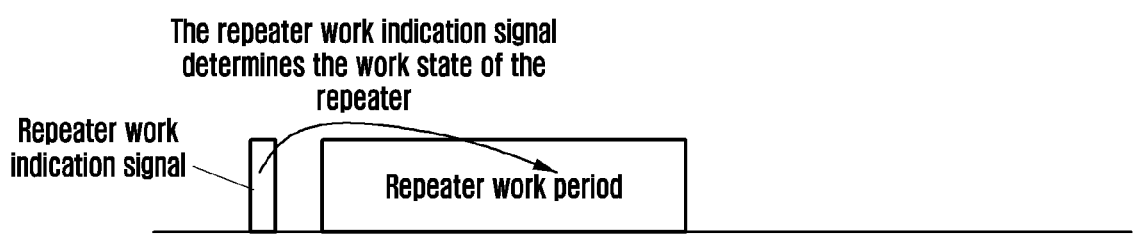
FIG. 8 illustrates a schematic diagram of determining a repeater's work state according to a repeater work indication signal according to an embodiment of the present disclosure.

FIG. 8 illustrates a schematic diagram of determining a repeater work state according to a repeater work indication signal according to an embodiment of the present disclosure.

Specifically, as shown in FIG. 8, the repeater measures the intensity of the repeater work state indication signal. Then, the repeater judges whether the intensity of the repeater work state indication signal is greater than a configured intensity threshold to determine whether there is data and/or control information that needs to be received and transmitted for the repeater.

That is, if the intensity of the repeater work state indication signal is greater than or equal to the configured intensity threshold, it means that there is data and/or control information that needs to be received and transmitted for the repeater within a determined time period after the indication signal; and if the intensity of the repeater work state indication signal is less than the configured intensity threshold, it means that there is no data and/or control information that needs to be received and transmitted for the repeater within a determined time period after the indication signal.

Alternatively, if the intensity of the repeater work state indication signal is greater than or equal to the configured intensity threshold, it means that there is no data and/or control information that needs to be received and transmitted for the repeater within a determined time period after the indication signal; and if the intensity of the repeater work state indication signal is less than the configured intensity threshold, it means that there is data and/or control information that needs to be received and transmitted for the repeater within a determined time period after the indication signal.

In the second method based on repeater work state information, the base station can create a dedicated repeater work state indication channel to be dedicatedly used for transmitting the repeater work state information.

The second method based on repeater work state information includes the following steps.

According to whether the information indication of the repeater work state indication channel can be got by blind detection, it is determined whether there is data and/or control information that the repeater needs to receive and transmit, so as to determine the work state of the repeater.

When the repeater work state indication channel is got by blind detection, the information indication of the repeater work state indication channel is determined, and the data and/or control information pointed to by the information indication of the repeater work state indication channel is received and transmitted.

Figure 9:
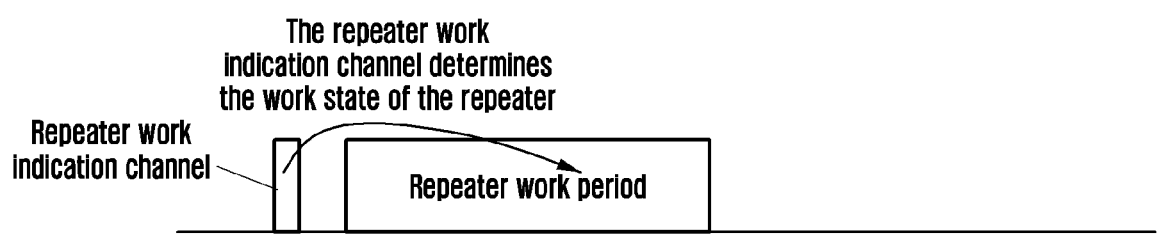
FIG. 9 a illustrates a schematic diagram of determining a repeater's work state according to a repeater work indication channel according to an embodiment of the present disclosure.

FIG. 9 illustrates a schematic diagram of determining a repeater work state according to a repeater work indication channel according to an embodiment of the present disclosure.

As shown in FIG. 9, preferably, the repeater determines whether there is data and/or control information for the repeater within one or more determined time periods after the indication information by blindly detecting the indication information in the repeater work state indication channel, that is, determines the work state of the repeater in the time period.

The repeater determines whether there is data and/or control information for the repeater by reading the indication information transmitted by the channel.

In another embodiment, the repeater can receive information indication of a work state indication channel for a repeater group, that is to say, one work state indication channel can indicate the work state of more than one repeater.

There are N (N is a positive integer, preset by the protocol or configured by the high-layer signaling) bits of information within a repeater work state indication channel, in which M (M is a positive integer, preset by the protocol or configured by the high-layer signaling) bits as one piece of bit information indicate the work state of each repeater within one or more determined time periods after the indication signal (for example, when indicating the work state within a time period, M is equal to 1; and when indicating the work state within more than one time period, M is greater than 1), and each bit is used to indicate whether there is data and/or control information for this repeater. For example, N is 10 bits, where the first bit indicates the work state of repeater 1, the second bit indicates the work state of repeater 2, and so on.

For example, when the bit value is "0," it is determined that there is no data and/or control information for this repeater within one or more determined time periods after the indication signal; and when the bit value is "1," it is determined that there is data and/or control information for this repeater within one or more determined time periods after the indication signal. The mapping relationship between each bit of indication information and each repeater can be configured by high-layer signaling, indicated by system information, or obtained implicitly. For example, the mapping relationship may be derived from the ID of the repeater (which is implicit).

A repeater determines the work state of the repeater by receiving the information of the work state indication channel (DCI) for the repeater.

Figure 10:
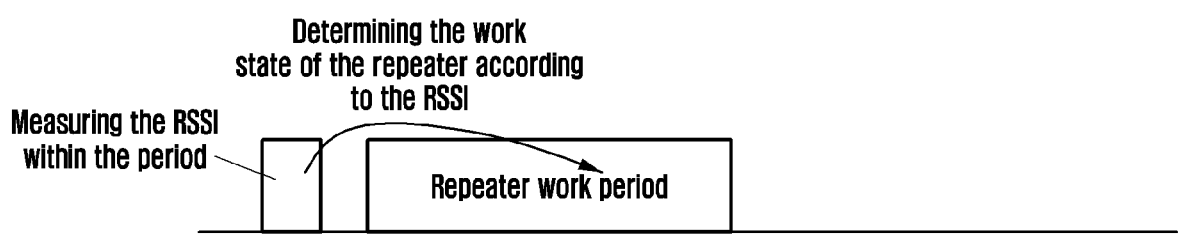
FIG. 10 illustrates a schematic diagram of determining a repeater's work state according to measurement of the RSSI in a time period according to an exemplary embodiment of the present disclosure.

In the third method based on repeater work state information, the repeater can also determine the work state of the repeater by measuring the energy within a time period, for example, measures the reference signal received power (RSRP) or received signal strength indicator (RSSI) within a time period to determine the work state of the repeater within another time period. FIG. 10 illustrates a schematic diagram of determining the work state of the repeater according to measurement of the RSSI within a time period according to an exemplary embodiment of the present disclosure. In an alternative embodiment, the RSSI can be replaced by the RSRP or other information that can reflect the energy in a time period.

As shown in FIG. 10, for example, if the RSRP or RSSI within a time period is greater than or equal to the configured threshold, it means that there is data and/or control information that needs to be received and transmitted for this repeater within a determined time period after the indication signal; and if the RSRP or RSSI within a time period is less than the configured threshold, it means that there is no data and/or control information that needs to be received and transmitted for this repeater within a determined time period after the indication signal.

The work state information of the repeater can be indicated in combination with the uplink and downlink indication information, that is, the work state information of the repeater can be indicated with the uplink and downlink indication information within a channel, for example, in an indication channel (for example, a format of the indication channel is DCI format y), and the control information in the indication channel can include M (M is a positive integer) information blocks for indicating the uplink and downlink information, each information block including Nm bits of information. Each information block indicates the uplink and downlink information for a group of repeaters (this group of repeaters includes at least one repeater), for example, the first N1-bit information block is for the uplink and downlink information of the first repeater group, the second N2-bit information block is for the uplink and downlink information of the second repeater group, and so on.

The control information in the indication channel may also include K (K is a positive integer) information blocks for indicating the work state of the repeaters, each information block includes Lk bits of information, and each information block indicates the work state of repeaters for a group of repeaters (this group of repeaters includes at least one repeater), for example, the first L1-bit information block is for the work state of the repeaters of the first repeater group, the second L2-bit information block is for the work state of the repeaters of the second repeater group, and so on. Depending on the specific example, the above-mentioned M and K may be the same or different.

The following describes the operation of the repeater after the repeater knows the work state of the repeater. When the repeater knows that the work state of the repeater is working by receiving information or measurement, the repeater works. When the repeater knows that the work state of the repeater is stopping by receiving information or measurement, the repeater stops working. When the repeater does not know the work state of the repeater, the repeater can adopt the default work state. The default work state can have two work states. The first work state is that the repeater performs forwarding work. The advantage of adopting this method is that the repeater may not affect the forwarding work. The second work state is that the repeater stops forwarding work. The advantage of adopting this method is that the repeater may not forward useless noise and interference. The first work state or the second work state can be determined by the protocol or high-layer signaling configuration.

When the node device is in the second work state, although forwarding data and control information between the UE and the base station is stopped, the node device can transmit uplink signals (SRS and/or PRACH) or uplink channels (PUCCH and/or PUSCH) to the base station. The advantage of doing this is that transmitting uplink signals and uplink channels to the base station by the node device is separated from forwarding data and control information by the node device in time, which reduces the complexity of node device implementation.

In order to improve the performance of receiving and transmitting data and control signaling between the repeater and the UE, the data and control signaling can be received and transmitted through the determined beam. In an embodiment, the beam can be indicated and determined by repeater beam indication information.

There are M information blocks (M is a positive integer, preset by the protocol or configured by the high-layer signaling) within a piece of repeater beam indication information, and each information block has L (L is a positive integer, the value of L is preset by the protocol or configured by high-layer signaling) bits of information, where each information block indicates the information for each repeater beam.

Figure 11:
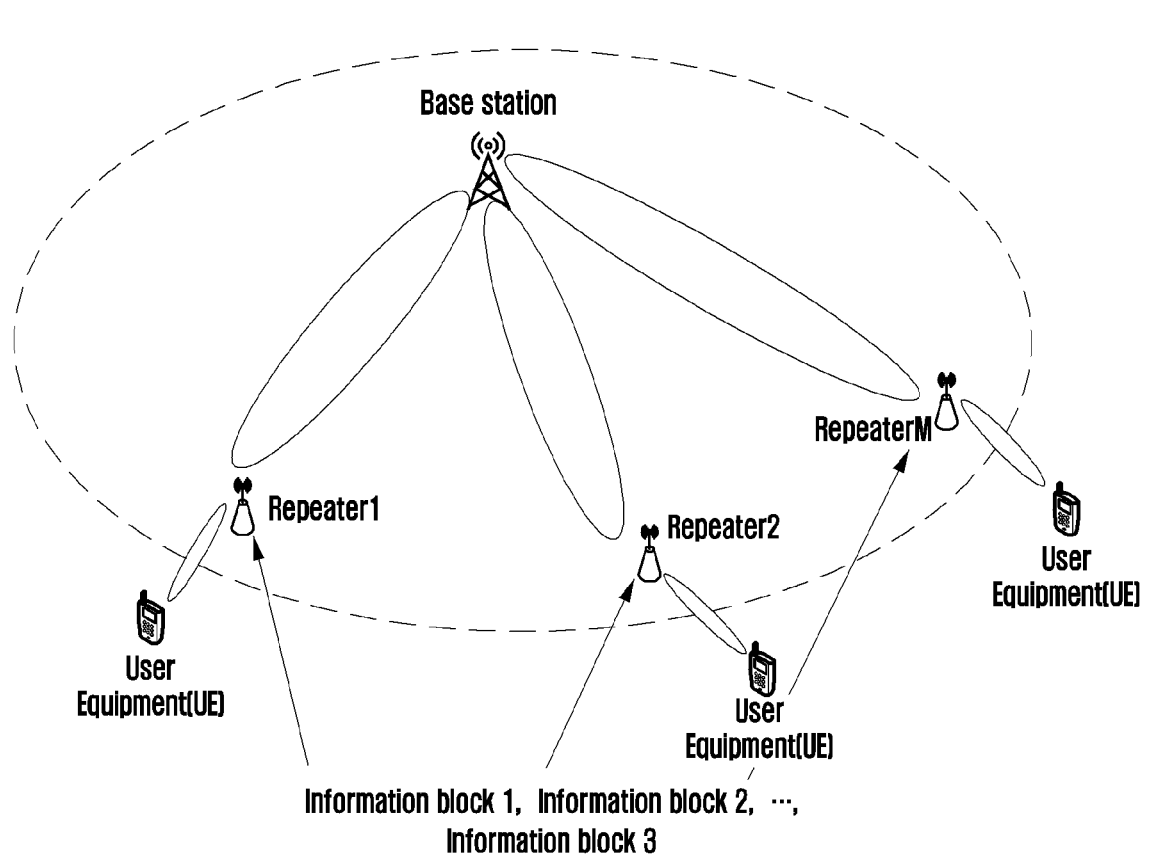
FIG. 11 illustrates the mapping relationship between repeater beam indication information and a repeater according to an exemplary embodiment of the present disclosure.

FIG. 11 illustrates the mapping relationship between repeater beam indication information and a repeater according to an exemplary embodiment of the present disclosure. As shown in FIG. 11, the first information block in the beam indication information (such as information block 1 in FIG. 11) indicates the beam of repeater 1, the second information block in the beam indication information (such as information block 2 in FIG. 11) indicates the beam of repeater 2, and so on, and the M-th information block in the beam indication information (such as information block M in FIG. 11) indicates the beam of repeater M. The repeater beam indication information can be group-common DCI, and a group of repeaters can receive the information of this DCI, and then each repeater determines its own transmitting and receiving beams according to the corresponding information in the DCI, or the repeater beam indication information can be medium access layer signaling (MAC layer signaling).

The mapping relationship between each information block within the repeater beam indication information and each repeater can be configured by high-layer signaling, indicated by system information, or obtained implicitly. For example, the mapping relationship may be derived from the ID of the repeater (implicitly), where the system information, namely SIB, can be an existing SIB, for example, SIB1, or a SIB specific to the repeater. The method that the repeater obtains the above indication information by reading the SIB can make the repeater be able to know whether the serving cell has the indication information related to the repeater before accessing the system, thus avoiding finding that the serving cell does not have the repeater indication information after accessing the system.

The repeater obtains the period of the repeater blindly detecting group-common DCI, the format of the DCI, the payload size of the DCI, the control resource set (CORESET), the Search space and the contents indicated by the fields in the DCI by receiving high-layer signaling. Only after obtaining these pieces of information, the repeater can blindly detect the group-common DCI and correctly interpret the contents in the DCI according to these pieces of information. This high-layer signaling can be cell-specific high-layer signaling configuration information (this information can be system information, that is, SIB, which can be an existing SIB, for example, SIB 1, or a SIB specific to the repeater). The method that the repeater obtains the indication information by reading the SIB can make the repeater be able to know whether the serving cell has the indication information related to the repeater before accessing the system, thus avoiding finding that the serving cell does not have the repeater indication information after accessing the system.

The repeater indicates the beam of the repeater by the method of receiving the beam indication information for the repeater.

The repeater receives and transmits data and control signaling according to the indicated beam. If the repeater does not receive the indicated beam, the repeater uses a specific beam to receive and transmit the data and control signaling, for example, an omnidirectional beam. Alternatively, the repeater beam indication and the repeater work state can be jointly indicated, that is, the work state of the repeater with the indicated beam is working during the corresponding time period when the indicated beam is used, while the work state of the repeater without the indicated beam is stopping working during the corresponding time period when there is no indicated beam.

The work state information of the repeater can be indicated in combination with at least one of the uplink and downlink indication information and the repeater beam indication information, that is, at least two of the work state information of the repeater, the uplink and downlink indication information and the repeater beam indication information are indicated within a channel.

Figure 12:
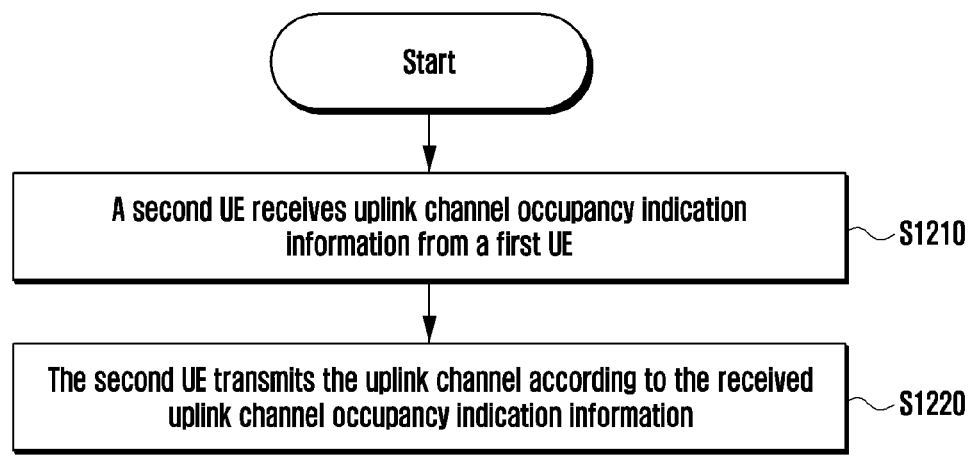
FIG. 12 illustrates an exemplary flowchart of a method for transmitting indication information according to an embodiment of the present disclosure.

In order to make full use of uplink resources, the UE can determine whether the UE transmits the scheduled uplink channel by receiving the information indication transmitted by other UEs (for example, the uplink channel is a physical uplink shared channel (PUSCH), which will be described below as an example, and the scheduled uplink channel can also be a physical uplink control channel (PUCCH) or a sounding reference signal (SRS)), as shown in FIG. 12.

FIG. 12 illustrates an exemplary flowchart of a method 1200 for transmitting indication information according to an embodiment of the present disclosure. The method 1200 may be implemented at the UE side.

As shown in FIG. 12, at step S1210 of the method 1200, a second UE receives uplink channel occupancy indication information from a first UE.

At step S1220, the second UE transmits the uplink channel according to the received uplink channel occupancy indication information. The uplink channel can be PUSCH, PUCCH or SRS.

Figure 13:
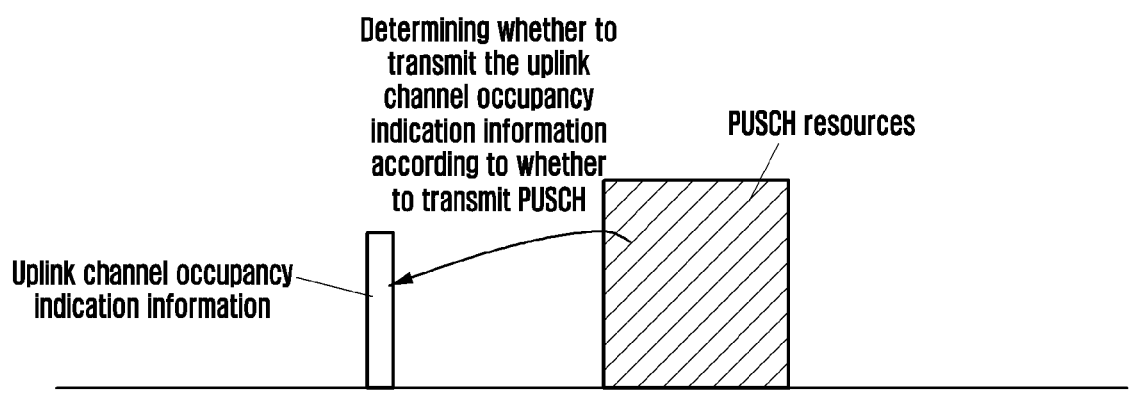
FIG. 13 illustrates a schematic work diagram of a first UE according to an exemplary embodiment of the present disclosure.
Figure 14:
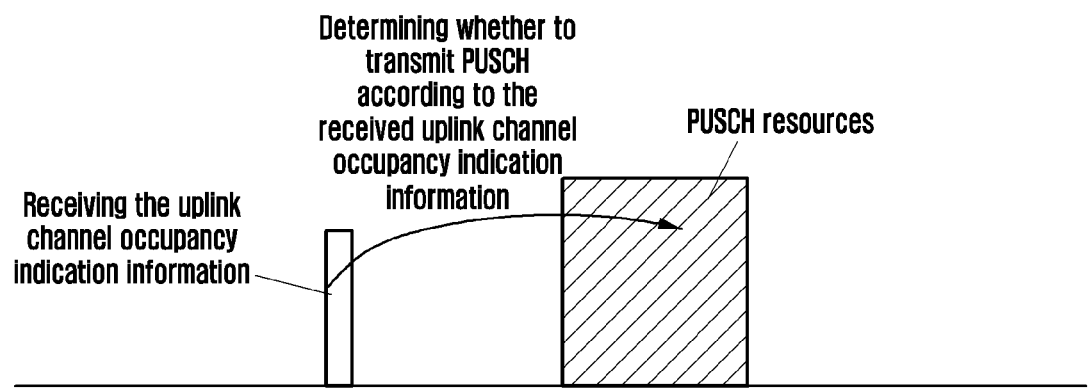
FIG. 14 illustrates a schematic work diagram of a second UE according to an exemplary embodiment of the present disclosure.

FIG. 13 illustrates a schematic work diagram of a first UE according to an exemplary embodiment of the present disclosure. And FIG. 14 illustrates a schematic work diagram of a second UE according to an exemplary embodiment of the present disclosure. More specifically, the first UE decides whether the UE transmits the uplink channel occupancy indication information according to whether the UE occupies the resources of the corresponding time-frequency position to transmit the uplink channel. One example method is that the first UE has PUSCH (for example, configured grant (CG) PUSCH) resources to transmit data within time unit n. At this time, if the UE has uplink data that needs to be transmitted, the UE may use the CG PUSCH to transmit the uplink data. If the UE has no uplink data to transmit, the UE may not transmit the CG PUSCH. If the UE wants to transmit the CG PUSCH within time unit n, the UE may transmit the uplink channel occupancy indication information at a determined time-frequency position before time unit n. If the UE does not transmit the CG PUSCH within time unit n, the UE may not transmit the uplink channel occupancy indication information at a determined time-frequency position before time unit n, as shown in FIG. 13.

The second UE receives the uplink channel occupancy indication information transmitted by the first UE, and then determines whether the UE transmits the uplink channel according to the received uplink channel occupancy indication information. If the second UE receives the uplink channel occupancy indication information, the second UE may not transmit the PUSCH within time unit n; and if the second UE does not receive the uplink channel occupancy indication information, the second UE may transmit the PUSCH within time unit n.

Another example method is that the first UE has PUSCH (for example, configured grant (CG) PUSCH) resources to transmit data within time unit n. At this time, if the UE has uplink data that needs to be transmitted, the UE may use the CG PUSCH to transmit the uplink data. If the UE has no uplink data to transmit, the UE may not transmit the CG PUSCH. If the UE wants to transmit the CG PUSCH within time unit n, the UE may not transmit the uplink channel occupancy indication information at a determined time-frequency position before time unit n. If the UE does not transmit the CG PUSCH within time unit n, the UE may transmit the uplink channel occupancy indication information at a determined time-frequency position before time unit n. The second UE receives the uplink channel occupancy indication information transmitted by the first UE, and then determines whether the UE transmits the uplink channel according to the received uplink channel occupancy indication information. If the second UE receives the uplink channel occupancy indication information, the second UE may transmit the PUSCH within time unit n; and if the second UE does not receive the uplink channel occupancy indication information, the second UE may not transmit the PUSCH within time unit n.

In an embodiment, the uplink channel occupancy indication information transmitted by the first UE may be a signal, that is, a sequence. In another embodiment, the uplink channel occupancy indication information transmitted by the first UE may be a control channel (for example, in DCI format). With this method, the uplink resources can be fully utilized as much as possible on the premise of meeting the delay requirements of high-reliability and low-delay services.

Figure 15:
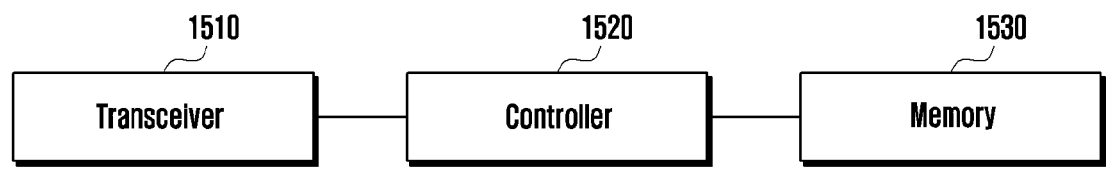
FIG. 15 illustrates a schematic structural block diagram of a node device or UE according to an exemplary embodiment of the present disclosure.

FIG. 15 illustrates a block diagram according to an embodiment of the present disclosure.

Referring to FIG. 15, a node device (such as the repeater described above) or a UE apparatus according to the present disclosure may include a transceiver 1510, a controller 1520 and a memory 1530, respectively. The transceiver 1510, the controller 1520 and the memory 1530 are configured to perform the operation of one of the above embodiments of the present disclosure. Although the transceiver 1510, the controller 1520 and the memory 1530 are shown as separate entities, they can be implemented as a single entity, such as a single chip. The transceiver 1510, the controller 1520 and the memory 1530 may be electrically connected or coupled to each other. The transceiver 1510 can send and receive signals to and from other network devices, such as a UE, a base station or a core network node or other node devices. The controller 1520 may include one or more processing units, and may control node devices or UE apparatus to perform operations and/or functions according to one of the above embodiments. The memory 1130 may store instructions for implementing the operations and/or functions of one of the above embodiments.

Those skilled in the art can realize that the present disclosure can be realized in other specific forms without changing the technical idea or basic characteristics of the present disclosure. Therefore, it should be understood that the above embodiments are only examples and are not limited. The scope of the present disclosure is defined by the appended claims instead of the detailed description. Therefore, it should be understood that all modifications or changes derived from the meaning and scope of the appended claims and their equivalents are within the scope of this disclosure.

In the above embodiments of the present disclosure, all operations and messages may be selectively performed or may be omitted. In addition, the operations in each embodiment need not be performed sequentially, and the order of the operations can be changed. Messages do not need to be transferred in order, and the transferring order of messages may change. Each operation and each message transfer can be performed independently.

Although the present disclosure has been shown and described with reference to various embodiments thereof, those skilled in the art will understand that various changes in form and details can be made without departing from the spirit and scope of the present disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a repeater in a communication system, the method comprising:
   receiving, from a base station, first information on a cell-specific time division duplex (TDD) configuration and second information on a dedicated TDD configuration;
   receiving, from the base station, downlink data, only in a symbol indicated as a downlink (DL) based on the first information and the second information; and
   transmitting, to the base station, uplink data, only in a symbol indicated as an uplink (UL) based on the first information and the second information.

2. The method of claim 1, further comprising:
   transmitting, to a user equipment (UE), the downlink data, only in the symbol indicated as the downlink based on the first information and the second information.

3. The method of claim 1, further comprising:
   receiving, from a UE, only in the symbol indicated as the uplink based on the first information and the second information.

4. The method of claim 1, further comprising:
   receiving, from the base station, an indication for one or more beams; and
   transmitting or receiving data over corresponding one or more time resources.

5. The method of claim 1,
   wherein the first information is received via a system information block (SIB), and
   wherein the second information is received via a high-layer signaling.

6. The method of claim 1,
   wherein the repeater stops a transmission and a reception in a flexible period, and
   wherein whether the symbol is in the flexible period is determined based on the first information.

7. A method performed by a base station in a communication system, the method comprising:
   transmitting, to a repeater, first information on a cell-specific time division duplex (TDD) configuration and second information on a dedicated TDD configuration;
   transmitting, to the repeater, downlink data, only in a symbol indicated as a downlink (DL) based on the first information and the second information; and
   receiving, from the repeater, uplink data, only in a symbol indicated as an uplink (UL) based on the first information and the second information.

8. The method of claim 7, further comprising:
   transmitting, to the repeater, an indication for one or more beams; and
   receiving or transmitting data over corresponding one or more time resources,
   wherein the first information is received via a system information block (SIB), and
   wherein the second information is received via a high-layer signaling.

9. A repeater in a communication system, the repeater comprising:
   a transceiver; and
   a controller configured to:
      receive, from a base station, first information on a cell-specific time division duplex (TDD) configuration and second information on a dedicated TDD configuration,
      receive, from the base station, downlink data, only in a symbol indicated as a downlink (DL) based on the first information and the second information, and
      transmit, to the base station, downlink data, only in a symbol indicated as an uplink (UL) based on the first information and the second information.

10. The repeater of claim 9, wherein the controller is further configured to:
    transmit, to a user equipment (UE), the downlink data, only in the symbol indicated as the downlink based on the first information and the second information.

11. The repeater of claim 9, wherein the controller is further configured to:
    receive, from a UE, only in the symbol indicated as the uplink based on the first information and the second information.

12. The repeater of claim 9, wherein the controller is further configured to:
    receive, from the base station, an indication for one or more beams, and
    transmit or receive data over corresponding one or more time resources.

13. The repeater of claim 9,
    wherein the first information is received via a system information block (SIB), and
    wherein the second information is received via a high-layer signaling.

14. The repeater of claim 9,
    wherein the repeater stops a transmission and a reception in a flexible period, and wherein whether the symbol is in the flexible period is determined based on the first information.

15. A base station in a communication system, the base station comprising:
a transceiver; and
a controller coupled with the transceiver, and configured to:
transmit, to a repeater, first information on a cell-specific time division duplex (TDD) configuration and second information on a dedicated TDD configuration,
transmit, to the repeater, downlink data, only in a symbol indicated as a downlink (DL) based on the first information and the second information, and
receive, from the repeater, uplink data, only in a symbol indicated as an uplink (UL) based on the first information and the second information.

16. The base station of claim 15, wherein the controller is further configured to:
transmit, to the repeater, an indication for one or more beams, and
receive or transmitting data over corresponding one or more time resources,
wherein the first information is received via a system information block (SIB), and
wherein the second information is received via a high-layer signaling.

* * * * *